(12) United States Patent
Parke

(10) Patent No.: US 7,527,727 B2
(45) Date of Patent: May 5, 2009

(54) ADSORPTION SYSTEM

(75) Inventor: Geary G. Parke, Clarkston, MI (US)

(73) Assignee: Plymouth Technology, Inc., Rochester Hills, MI (US)

( * ) Notice: Subject to any disclaimer, the term of this patent is extended or adjusted under 35 U.S.C. 154(b) by 0 days.

(21) Appl. No.: 12/028,086

(22) Filed: Feb. 8, 2008

(65) Prior Publication Data

US 2008/0128338 A1   Jun. 5, 2008

Related U.S. Application Data

(62) Division of application No. 10/691,297, filed on Oct. 22, 2003, now abandoned.

(51) Int. Cl.
  *B01D 15/00* (2006.01)
(52) U.S. Cl. .................. 210/96.1; 210/199; 210/202; 210/203; 210/259; 210/284; 210/317; 210/501; 210/502.1
(58) Field of Classification Search ............ 210/96.1, 210/284, 317, 501, 502.1, 199, 202, 203, 210/259, 263, 287
See application file for complete search history.

(56) References Cited

U.S. PATENT DOCUMENTS

| | | |
|---|---|---|
| 1,678,676 A | 7/1928 | Lewis |
| 3,316,055 A | 4/1967 | Moncada |
| 3,384,240 A | 5/1968 | Berardi |
| 3,616,915 A | 11/1971 | Whitlock |
| 3,870,033 A | 3/1975 | Faylor |
| 3,985,648 A | 10/1976 | Casolo |
| 4,118,341 A | 10/1978 | Ishibashi |
| 4,626,359 A | 12/1986 | Bennett |
| 4,693,828 A | 9/1987 | Yoshioka |
| 4,902,427 A | 2/1990 | Szczepanik |
| 5,320,773 A | 6/1994 | Perman |
| 5,427,683 A | 6/1995 | Gershon et al. |
| 5,503,658 A | 4/1996 | Zarchy |
| 5,536,403 A | 7/1996 | Sugimoto |
| 5,635,075 A | 6/1997 | Boyd |
| 5,665,240 A | 9/1997 | Hong |
| 5,670,435 A | 9/1997 | Kajita |
| 5,932,111 A | 8/1999 | Christensen |
| 6,057,072 A | 5/2000 | Guistina |
| 6,197,193 B1 * | 3/2001 | Archer ............... 210/266 |
| 6,217,775 B1 | 4/2001 | Conca |

(Continued)

FOREIGN PATENT DOCUMENTS

JP        60000889 A  *  1/1985

OTHER PUBLICATIONS

English language translation of JP 60000889 A to Yoshio Asai published on Jan. 1985.*

*Primary Examiner*—Matthew O Savage
(74) *Attorney, Agent, or Firm*—Dickinson Wright, PLLC

(57) ABSTRACT

An adsorption apparatus and method of adsorption for treatment of wastewater is disclosed, and comprises an inlet for the wastewater connected to a metals trap which adsorbs metals and a second trap which filters organic materials from the wastewater, positioned between the inlet and the metals trap, wherein the second trap at least partially comprises either a phosphate or an activated carbon. The metals trap can be, for example, fish bone char. A method of manufacturing fish bone char is also disclosed.

10 Claims, 1 Drawing Sheet

U.S. PATENT DOCUMENTS

| | | |
|---|---|---|
| 6,274,045 B1 | 8/2001 | Kreisler |
| 6,454,963 B1 | 9/2002 | Sesay |
| 6,533,847 B2 | 3/2003 | Seguin |
| 6,706,195 B2 | 3/2004 | Jensen |
| 6,811,703 B2 | 11/2004 | Elliott |
| 7,183,235 B2 | 2/2007 | Lovell et al. |
| 2002/0053547 A1 | 5/2002 | Schlegel |
| 2005/0087495 A1 | 4/2005 | Parke |
| 2005/0159063 A1 | 7/2005 | Hill |
| 2006/0032807 A1 | 2/2006 | Sansalone |
| 2006/0148933 A1 | 7/2006 | Sutherland |
| 2006/0211906 A1 | 9/2006 | Berezutskiy |
| 2006/0293170 A1 | 12/2006 | Lovell |

* cited by examiner

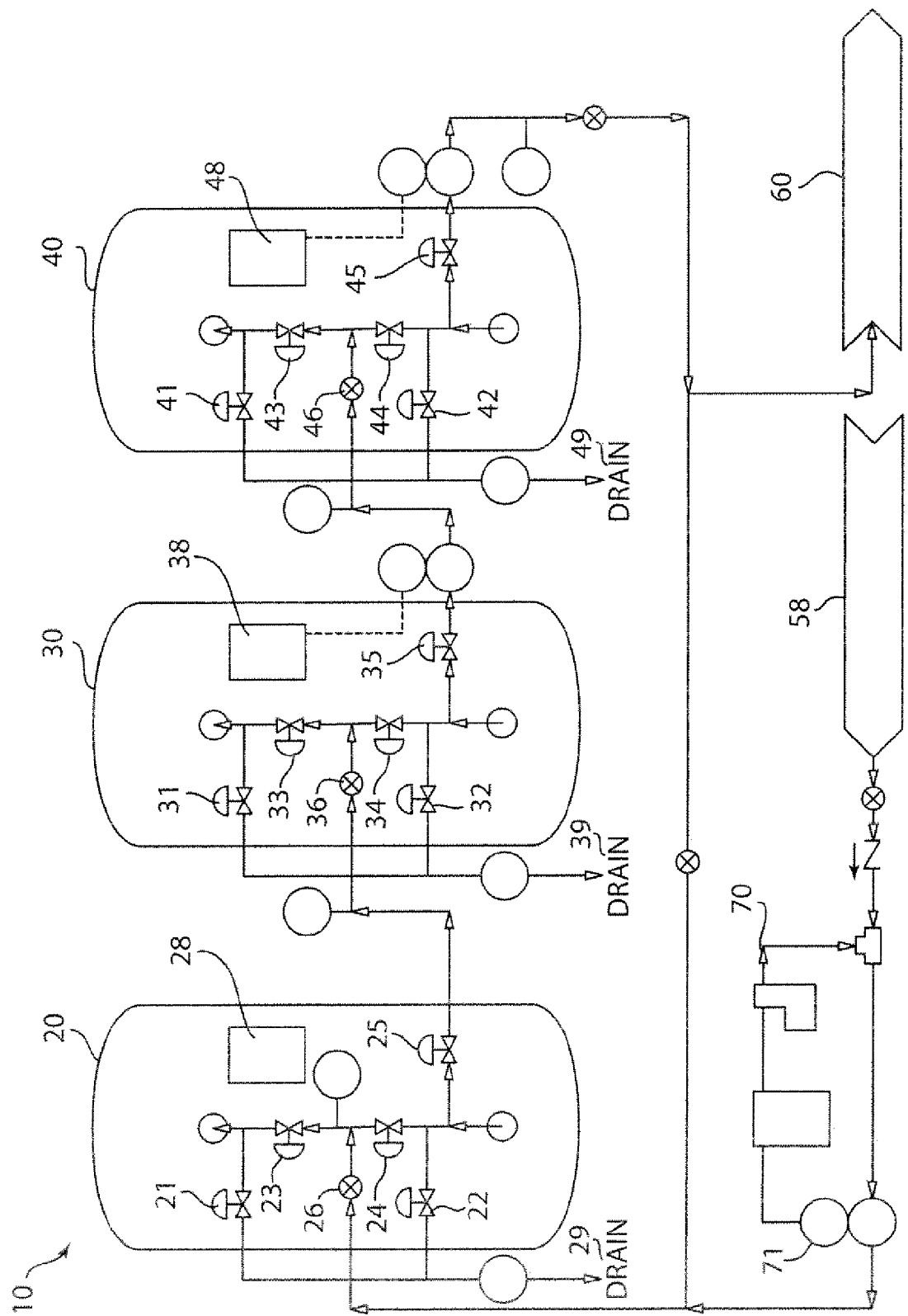

US 7,527,727 B2

ADSORPTION SYSTEM

RELATED APPLICATION

This application is a divisional patent application of Ser. No. 10/691,297 filed on Oct. 22, 2003, now abandoned.

FIELD OF THE INVENTION

This invention relates to improvements to treatment systems for industrial wastewater, and more particularly to improved adsorption systems for removal of particulates, oils, metals and other impurities from wastewater.

BACKGROUND OF THE INVENTION

Industrial wastewater can contain many different kinds of impurities, including, for example, greases, oils, metals and other inorganic compounds, solid particulate matter (dirt), organic compounds, etc. It is desirable to remove as much of these impurities as possible. Further, government regulations require removal of impurities, particularly some metals, and such regulations have become increasingly stringent. Known techniques for removal of metals from wastewater include ultrafiltration, reverse osmosis, and ion exchange techniques. These techniques are all relatively expensive and generally produce a concentrated waste which requires further handling or treatment.

Physical-chemical treatment processes are also commonly used to purify wastewater. In these systems, hydroxide or sulfide precipitation is used. A lime slurry, caustic soda, ferrous or other soluble sulfide salts precipitates a wide range of dissolved impurities and induces aggregation and precipitation of particulate materials and specifically metal ions. In these systems, metal salts (typically iron), coagulating chemicals and polymers are often used to encourage the colloidal metal hydroxide or sulfide particulate to coagulate and flocculate. The resulting flocs with their accumulated contaminants are then removed either by sedimentation or filtration. However, such known techniques have limitations. Specifically, physical-chemical processes are susceptible to organic materials in the wastewater impurities. That is, the organic materials can interfere with precipitation and removal of metals, reducing the efficacy of the system. Moreover, systems have difficulty meeting the new, more stringent federal requirements. Additionally, hydroxide precipitates will not precipitate complexed metals. Complexed metals have a tendency to remain bound in solution bound rather than form precipitates and settle out. These metals have reacted with complexing agents such as EDTA, ammonia, etc. Furthermore, while sulfide precipitation provides greater metal removal efficiency than hydroxide precipitation, it is relatively expensive and it produces toxic hydrogen sulfide gas if the pH drops below 8. As a result sulfide precipitation is rarely used. It would be highly desirable to have a low cost and highly effective system for removal of metals and other impurities out of industrial wastewater.

Animal bone charcoal (Bone Black, Bone Char) is the product of the dry distillation of animal bones. Raw materials used for bone charcoal production have heretofore been exclusively of bovine origin. Bones from other animals, such as pigs, goats, horses, etc., have proven to be unsuitable for making bone char, as they are too brittle and do not have the porosity of cattle bones. Bone charcoal has been shown to be effective in reducing the levels of many contaminants in water. For example, U.S. Pat. No. 4,902,427 to Szczepanik describes use of a filter cartridge for removing heavy metals and organic contaminants from water. The cattle bone char used has a particulate size of no larger than 200 mesh. (The larger the mesh, the smaller the diameter of the bone char.) In many applications for treatment and removal of impurities from industrial wastewater such known commercially available bone char is too expensive to use for larger flow rates and higher metals loading.

Such known cattle bone char of small particulate size is not practical for industrial wastewater applications using pressurized vessels. This is because of the long reaction time required, the tendency of the bone char to compact, forming a unreactive, rock-like material, and the tendency of the bone char to blow out of the vessel when pressurized.

U.S. Pat. No. 6,217,775 to Conca et al describes treatment of metal-contaminated leachates utilizing fish bones and fish hard parts. In such systems, fish bones and fish hard parts have "amounts of organics associated therewith". For many water treatment applications, such organics are undesirable and in fact counterproductive to treatment objectives.

SUMMARY OF THE INVENTION

In accordance with a first aspect, an adsorption apparatus for treatment of wastewater comprises an inlet for the wastewater connected to a metals trap which adsorbs metals and a second trap which filters organic materials from the wastewater, positioned between the inlet and the metals trap, wherein the second trap at least partially comprises a phosphate or an activated carbon.

In accordance with another aspect, a method of adsorption and removal of impurities from wastewater comprises the steps of restricting a size of the impurities to less than a predetermined size, passing the wastewater through a first chamber containing a solids trap, and passing the wastewater through a second chamber after passage through the first chamber where the second chamber contains a second trap for organic materials comprising a phosphate and/or an activated carbon. The metals trap can be, for example, fish bone char. A method of manufacturing fish bone char is also disclosed.

From the foregoing disclosure and the following more detailed description of various preferred embodiments it will be apparent to those skilled in the art that the present invention provides a significant advance in the technology of wastewater adsorption systems. Particularly significant in this regard is the potential the invention affords for providing a high quality, low cost, filtration treatment system that adsorbs large amounts of impurities, particularly metals. Additional features and advantages of various preferred embodiments will be better understood in view of the detailed description provided below.

BRIEF DESCRIPTION OF THE DRAWINGS

FIG. 1 is a schematic view of an adsorption system in accordance with a preferred embodiment.

It should be understood that the appended drawings are not necessarily to scale, presenting a somewhat simplified representation of various preferred features illustrative of the basic principles of the invention. The specific design features of the filtration system as disclosed here, including, for example, the specific dimensions of the filter chambers, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicated, refer to the orientation illustrated in the drawings. Top and up refers to the upward direction in the plane of the paper in FIG. 1, and bottom and down refer to the downward direction in the plane of the paper in FIG. 1

DETAILED DESCRIPTION OF CERTAIN PREFERRED EMBODIMENTS

It will be apparent to those skilled in the art, that is, to those who have knowledge or experience in this area of technology, that many uses and design variations are possible for the adsorption system disclosed here. The following detailed discussion of various alternative and preferred features and embodiments will illustrate the general principles of the invention with reference to an adsorption system suitable for use in industrial applications where wastewater generated would include some metals, solid particulates, various organic materials and the like. Other embodiments suitable for other applications will be apparent to those skilled in the art given the benefit of this disclosure.

Referring now to the drawings, in FIG. 1 shows an adsorption apparatus 10 which comprises an inlet 58 which receives industrial wastewater, a pH controller 70, a first chamber 20 containing a first trap which filters out solids and particulates down to a predetermined size, a second chamber 30 containing a second trap which, in accordance with an advantageous feature, filters out organic materials, a third chamber 40 with a third trap which filters out metals, and an outlet 60. Each trap preferably contains granules of a media selected for its adsorption and filtration properties in light of the impurities present in the wastewater stream which is to be cleaned.

In the preferred embodiment shown in the drawings each trap is placed in a separate chamber. This makes is easier to install and remove each trap. It will be readily understood by those skilled in the art given the benefit of this disclosure that more than one or all of the traps could be placed within a single chamber.

Wastewater is pumped in through the inlet 58 and through a pH controller 70. The controller 70 has a sensor 71 which monitors the pH level of the incoming wastewater. It is desirable to adjust the pH of the wastewater to make it close to a predetermined range, often around neutral, or pH 5.5-7.5, and most preferably about a pH of 7. For many of the industrial wastewaters requiring an adsorption system to remove metals, the wastewater at the inlet 50 is somewhat basic, often having a pH in the 9-9.5 range. Thus, in many applications the pH controller will be adding an acid, such as HCl, to the wastewater to lower the pH closer to neutral. It will be readily apparent to those skilled in the art, given the benefit of this disclosure, that a base may be added to the wastewater for those instances where the pH of the wastewater at the inlet is below neutrality, and that adjustment, as used herein, also refers to a situation where no adjustment is necessary. In addition to adjustment of the pH, it may be desirable to adjust the temperature of the wastewater to a predetermined value. This can also be accomplished prior to introduction of the wastewater to the first chamber 20.

Preferably, each chamber 20, 30, 40 has several valves (21-26, 31-36, 41-46, respectively) to control flow of wastewater into each chamber separate from the other chambers. Controllers 28, 38, 48 can be used to ensure that each valve is in its proper position (open/closed) depending on whether the system is in an operational mode or a diagnostic/service mode. Drains 29, 39, 49 are also provided, so that each of the chambers 20, 30, 40 can be flushed or backwashed if needed. Thus, each chamber can be individually serviced and cleaned and each trap can be individually removed and replaced without interfering with the other chambers and traps.

After any adjustments to pH and temperature, the wastewater moves into the first chamber 20. The first trap is positioned in the first chamber. The function of the first trap is to filter solid impurities out of the wastewater down to a predetermined size. For example, some filter materials can restrict passage of impurities larger than 5 microns. Examples of such filter materials include silica sand, charcoal, coal, and combinations of these materials.

Once the wastewater has been filtered of large solids in the first chamber 20, the wastewater is then ready for the second trap positioned in second chamber 30. The second trap is designed to trap organic materials and may comprise a phosphate such as calcium phosphate. More particularly, a bone char may be used such as fish bone char, which has a high porosity (and therefore greater adsorption of organic impurities) and is relatively inexpensive. Fish bone char has been discovered to have excellent metal adsorbent properties. Fish bone char may be made by rendering or boiling fish bone and fish parts (raw material) to remove fats, oily residues, and other organic impurities. Then the fish bone and fish parts are preferably heated in a low oxygen environment (preferably no oxygen) at high temperatures such as 500-900° C. for 5 to 30 hours, producing raw fish bone char. This raw material can then be processed to a desired mesh size, preferably 4 to 400 mesh, most preferably about 4 to 34 mesh, as a larger particle size is desirable for industrial wastewater treatment given the flow rates and retention times through the pressurized vessels. That is, if the particle size of the bone char is too small, the material will be forced out of the predetermined vessel without proper interaction (and adsorption) with the metals of the wastewater.

Activated carbon may also be used in the organics trap, either alone or in combination with a phosphate. Activated carbon is an effective absorbent primarily due to its extensive porosity and very large available surface area. The chemical nature of the carbon's adsorptive surface may also be important but is usually considered much less significant. Activated carbon works by transfer of impurities from the dissolved phase to the solid carbon surface. Activated carbon is generally non-polar in nature, and therefore has the greatest affinity for other non-polar substances. As a result, activated carbon is most effective in the removal from industrial wastewater of a variety of organic impurities, including, for example, trihalomethanes, pesticides and herbicides, and polycyclic aromatic hydrocarbons.

The third chamber 40 preferably contains a trap for metals. Such a trap can comprise, for example, media formed from "popcorn" like granule of a metal oxyhydroxide, with the metal comprising, for example, iron, magnesium, selenium, etc. The granules of the media used in the trap may have a pore size distribution profile optimized based on the molecular weight of the impurities in the wastewater. That is, the pore size of the media may be adjusted (typically by varying the temperature and time during the manufacture of the media) to approximate the size of the impurities to be adsorbed, thereby increasing adsorption of the impurities.

It has been found that some materials suitable for use in the organics trap will also adsorb some metals. In fact, in accordance with a preferred embodiment, a fish bone char in the second trap can adsorb metals and organics, and is better at adsorption of impurities from the wastewater in combination with a metal oxyhydroxide than either does alone. Other materials may be mixed in with both the organics trap and the metals trap, depending on the impurities in the wastewater. For example, a strong oxidizer may be used in either the organics trap, the metals trap, or both. Such strong oxidizers can comprise, for example, potassium permanganate, sodium hypochlorite, or a peroxide.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An adsorption apparatus for treatment of wastewater comprising:
   an inlet for wastewater connected to a pH controller;
   said pH controller including a pH sensor, said pH sensor measuring a pH of said wastewater and said pH controller adjusting said pH of said wastewater to a predetermined value of from pH 5.5 to pH 7.5;
   a first trap, said first trap filtering solids of a predetermined size from said wastewater;
   a second trap, said second trap having a composition comprising fish bone char and said second trap filtering organics from said wastewater;
   a third trap, said third trap filtering metals from said wastewater and having a composition other than said composition of said second trap; and
   said wastewater passing sequentially from said inlet to said pH controller, then to said first trap, then to said second trap and then to said third trap.

2. The adsorption apparatus of claim 1 wherein said predetermined size is about 5 microns or greater.

3. The adsorption apparatus of claim 1 wherein said first trap comprises silica sand, charcoal, coal, or mixtures thereof.

4. The adsorption apparatus of claim 1 wherein said fish bone char in said second trap has a mesh size of from 4 to 400 mesh.

5. The adsorption apparatus of claim 4 wherein said fish bone char in said second trap has a mesh size of from 4 to 34 mesh.

6. The adsorption apparatus of claim 1 wherein said composition of said second trap further comprises activated carbon.

7. The adsorption apparatus of claim 1 wherein said composition of said third trap comprises a metal oxyhydroxide.

8. The adsorption apparatus of claim 7 wherein said metal oxyhydroxide comprises an iron oxyhydroxide, a magnesium oxyhydroxide, a selenium oxyhydroxide, or mixtures thereof.

9. The adsorption apparatus of claim 7 wherein said third trap further includes potassium permanganate, sodium hypochiorite, or a mixture thereof.

10. The adsorption apparatus of claim 1 wherein said second trap further includes potassium permanganate, sodium hypochlorite, or a mixture thereof.

* * * * *